US007640737B2

(12) United States Patent
Hernandez, Jr. et al.

(10) Patent No.: US 7,640,737 B2
(45) Date of Patent: Jan. 5, 2010

(54) SCREW STYLE HYDRAULIC JACK

(75) Inventors: Hector Ray Hernandez, Jr., Fullerton, CA (US); Patrick B. Mayes, Logan, UT (US)

(73) Assignee: Alltrade Tools LLC, Long Beach, CA (US)

( * ) Notice: Subject to any disclaimer, the term of this patent is extended or adjusted under 35 U.S.C. 154(b) by 286 days.

(21) Appl. No.: 11/625,220

(22) Filed: Jan. 19, 2007

(65) Prior Publication Data

US 2008/0173013 A1 Jul. 24, 2008

(51) Int. Cl.
*F16D 31/02* (2006.01)

(52) U.S. Cl. ........................................................ 60/477

(58) Field of Classification Search ................... 60/477; 417/470

See application file for complete search history.

(56) References Cited

U.S. PATENT DOCUMENTS 2,420,910 A * 5/1947 Richards ................... 254/93 H
4,598,898 A 7/1986 Hsu et al.
4,706,937 A 11/1987 Chung
4,746,097 A 5/1988 Chung et al.
5,522,583 A 6/1996 Martin
5,648,606 A * 7/1997 Spalding ...................... 92/140
7,021,911 B2 * 4/2006 Moradmand et al. ........ 417/470

* cited by examiner

*Primary Examiner*—F. Daniel Lopez
(74) *Attorney, Agent, or Firm*—Fulwider Patton LLP

(57) ABSTRACT

A hydraulic jack system is described, suitable for lifting heavy loads such as automobiles. The jack system is operable by a powered driver fitted with a socket for coupling to a nut rotationally fixed to the jack system, wherein the driver is removable directly after use. As such, no handle is required for activating the hydraulic jack system. The jack system has a low profile, reducing the danger of being accidentally knocked into during operation. When operated by a powered driver, the driver rotates a camshaft mounted to the jack system, the camshaft reciprocally drives a push rod that activates a plunger for hydraulically elevating a piston ram.

8 Claims, 3 Drawing Sheets

SCREW STYLE HYDRAULIC JACK

BACKGROUND OF THE INVENTION

The present invention relates to hydraulic jacks for lifting loads such as automobiles and other heavy objects. More specifically, it relates to a device and method for conveniently and rapidly applying input energy needed to raise the ram piston of a hydraulic jack.

Hydraulic pistons are well known in the art, employing the well known principle of hydraulic leverage to impart an enormous force to a lifting ram under mechanical advantage. A small force is repeatedly applied to a plunger in a hydraulic cylinder which connects to a larger cylinder through an orifice. The numerous small repeated force applications to the plunger in the small cylinder are converted to a large force exerted by a ram piston in the large cylinder through known structures.

Typically, the force applied to the plunger in the small cylinder is manually applied through a pivoting handle, which is often removable. The handle acts as a lever having, to some degree, its own mechanical advantage. Thus, while the user applies a hand load to the end of the handle remote from the pivot point, the handle applies a load to the plunger at a moving point on its length nearer the pivot point, thereby multiplying the hand load to a load on the plunger in a range, typically, of about 10-15 times the hand load.

In another configuration known in the art, a motor may be connected to a hydraulic jack system. The motor may be configured to apply a reciprocating load to the plunger through a gear box which then applies a rotational force to an eccentric cam. The cam transmits a reciprocating force to the plunger.

However, problems remain in the prior art. Where a handle is used to apply a repeating load to the plunger, the handle presents a dangerous obstacle if it is left connected to the jack after the jack is used to elevate a load. Persons walking by the jack may accidentally knock the protruding handle and move the jack, thereby endangering the security of an elevated load. Storing a jack activated by a removable handle will always require storing the handle along with the jack. In a busy workshop, a handle may easily become separated from the jack, thus creating problems and inconvenience when next the jack is to be used. Where an electrical motor is mounted on a jack system for providing a reciprocating force to the plunger, inconvenience may be caused by electrical conduits extending from the motor. Moreover, the motor itself, when mounted to the jack system, creates an additional protrusion which adds to the profile of the jack, thus providing an additional source of danger by presenting added structure that may be accidentally knocked into when the jack system is supporting an elevated load.

Thus, there remains in the art a need for a low profile hydraulic jacking system that may be conveniently and rapidly activated by a user. The present invention satisfies these and other needs.

SUMMARY OF THE INVENTION

According to a preferred embodiment of the invention, there is described a hydraulic jacking system that overcomes shortcomings in the art. In a preferred embodiment, the hydraulic jack system is of a kind having a large hydraulic cylinder for elevating a ram piston, a small hydraulic cylinder hydraulically interconnected with the large cylinder for applying an input load via a plunger. The hydraulic jacking system of the present invention may include a base plate upon which the large cylinder and the small cylinder are mounted. A push rod is provided for reciprocally moving the plunger on a first axis. A camshaft is provided, configured to rotate about a second axis, the camshaft including a rotor offset from the second axis. The camshaft has a first terminal end and a second terminal end, each terminal end lying on the second axis. At least one terminal end of the camshaft is tipped only by a nut rotationally fixed to the at least one terminal end. In this configuration, the hydraulic jacking system is suitable for operation with a powered driver fitted with a socket for coupling to the nut, the driver being removable after use to leave the jacking system with a low profile for enhanced safety.

In another aspect of the invention, the push rod defines a linear slot extending perpendicular to the first axis, and the rotor is positioned to pass through the slot. The camshaft may be mounted to two frame members, each frame member being mounted on the base plate. A return spring may be configured to surround a portion of the push rod. In a further aspect, a collar may be mounted on the small hydraulic cylinder, and a portion of the push rod be configured to slide within the collar.

In yet a further aspect of the invention, each of the first and second terminal ends of the camshaft may be tipped only by a nut rotationally fixed to each terminal end. Each nut fixed to each terminal end may be positioned in relation to the jack system to receive a socket mounted on a powered driver. In this aspect, the jack system lends itself to operation by a powered driver from one of two points, adding versatility to the jack in that a user may apply a rotational load to the jack via one nut when the other nut is concealed by equipment or the like.

Finally, support may be provided for the camshaft at two positions along the camshaft. The support at the two positions may include ball bearings, and may also include two frame elements mounted to the base plate.

This configuration overcomes shortcomings in the prior art, and provides a robust, versatile, and inexpensive configuration for a hydraulic jacking system.

These and other advantages of the invention will become more apparent from the following detailed description thereof and the accompanying exemplary drawings.

DETAILED DESCRIPTION OF THE PREFERRED EMBODIMENTS

With reference to the drawings which are by way of example and not limitation, a hydraulic jack system is disclosed having features of the present invention.

Figure 1:
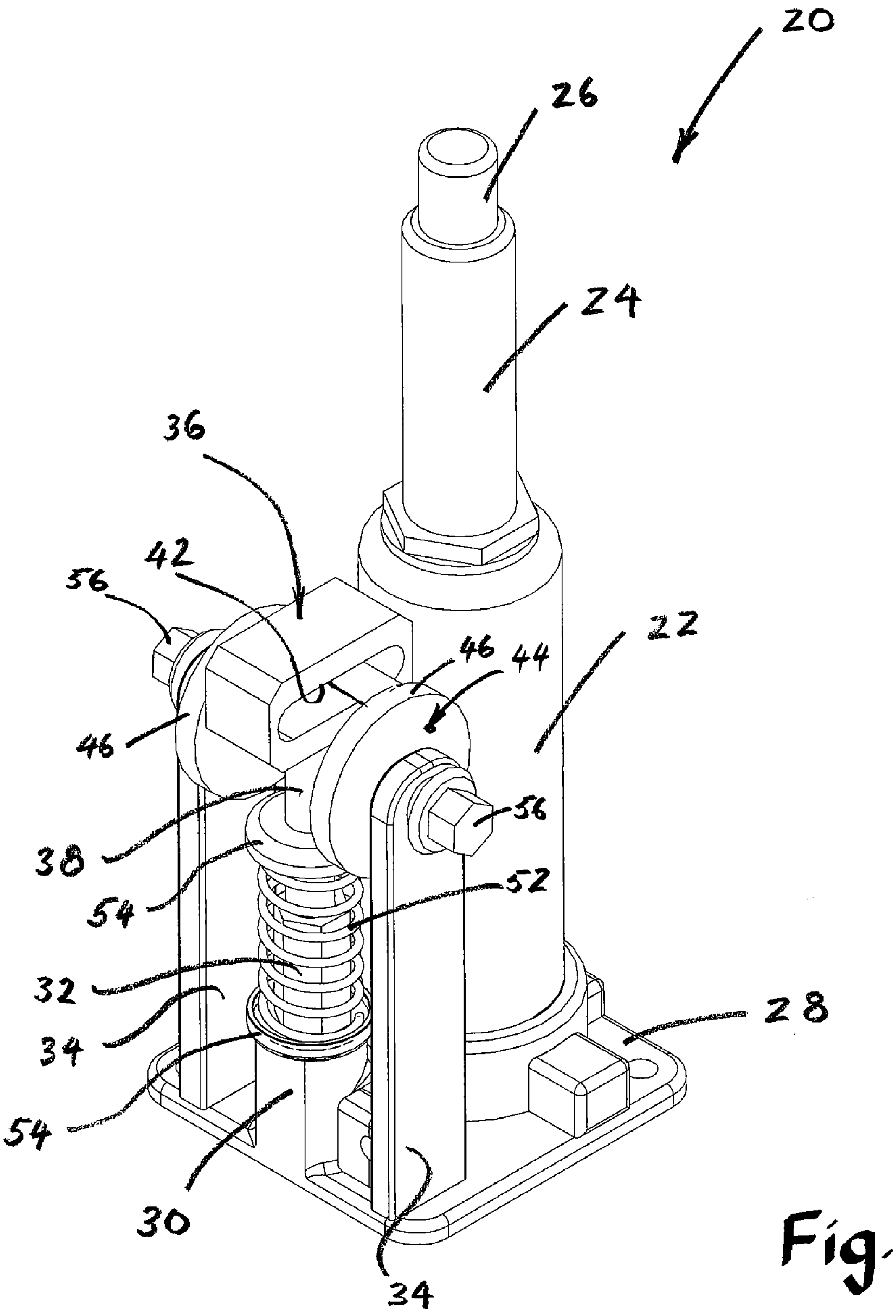
FIG. 1 is a perspective view of a hydraulic jack having features of the present invention.
Figure 2:
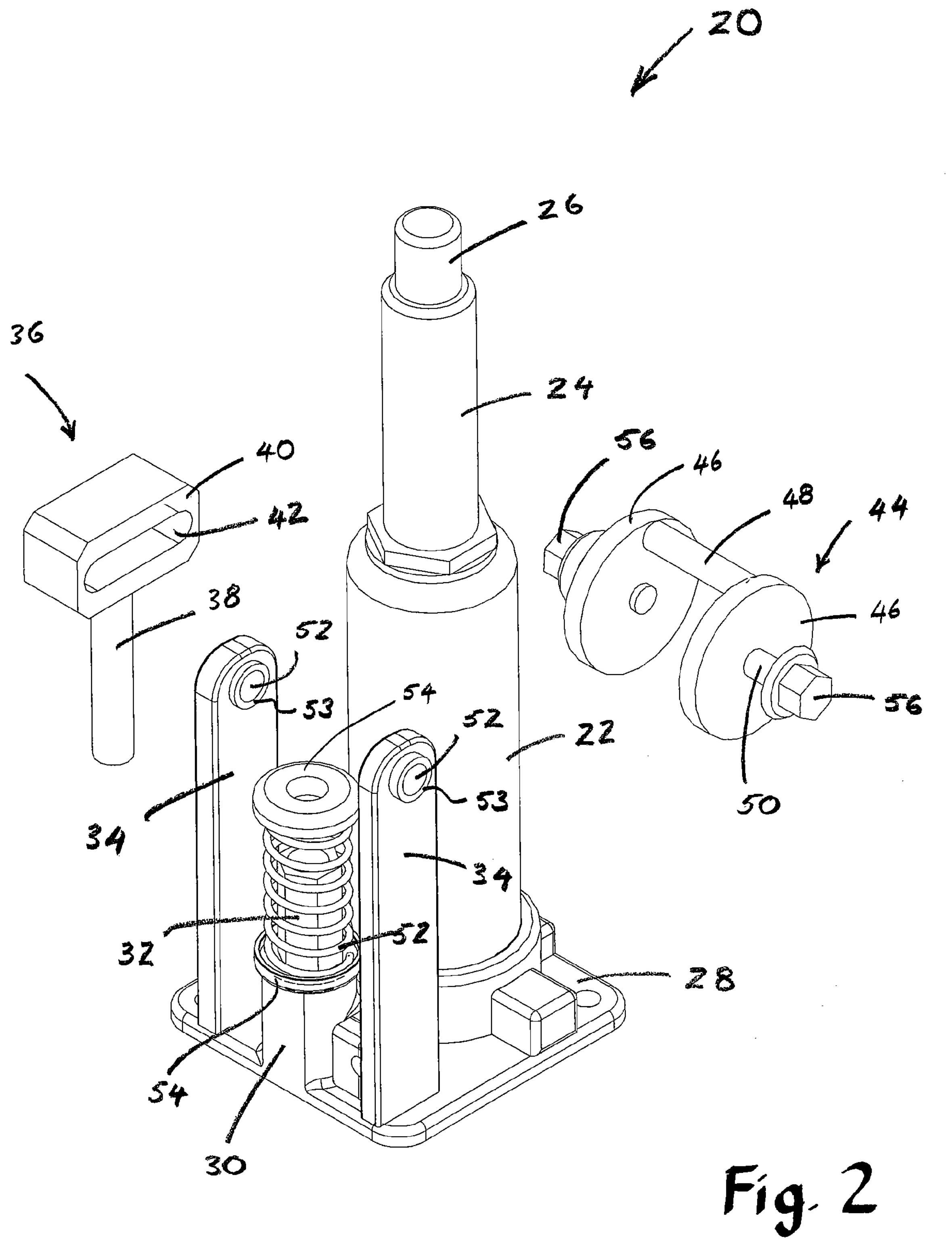
FIG. 2 is a partially exploded view of the jack of FIG. 1.

With reference to FIG. 1, there is seen a preferred embodiment of the hydraulic jack system of the present invention, generally identified by numeral 20. The jack system 20 includes a conventional large hydraulic cylinder 22 from which protrudes a first ram piston 24. In an alternative embodiment, the first ram piston 24 may include a second ram piston 26 extending co-axially with, and within, the first ram piston in a conventional way.

Figure 3:
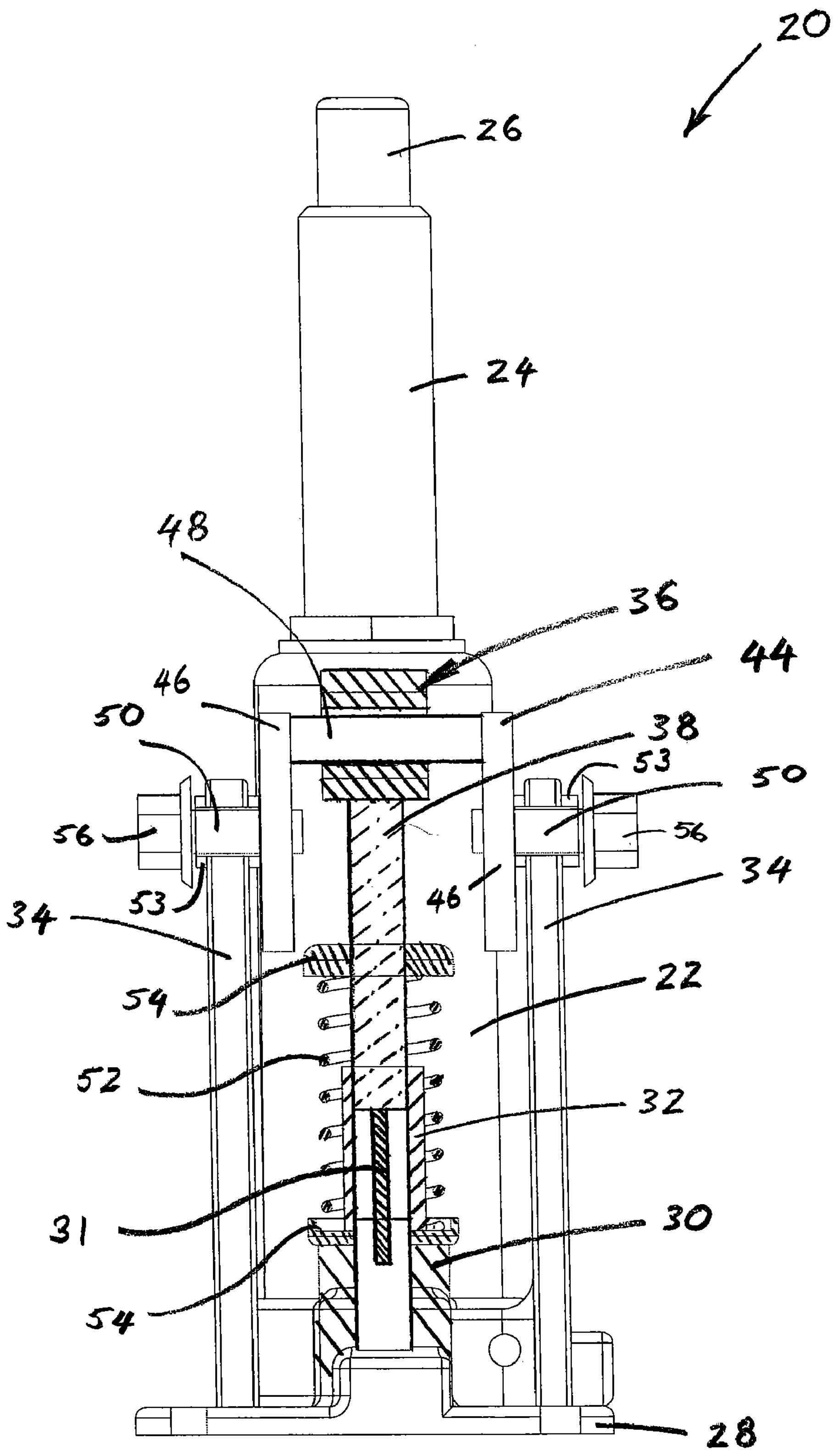
FIG. 3 is a side elevational view of the jack of FIG. 1, taken in partial section

The large cylinder 22 may be connected to a base plate 28 for stabilizing the jack system 20 as a whole. A small hydraulic cylinder 30 is provided, and is also connected to the base plate 28. The small cylinder 30 and the large cylinder 22 are interconnected by fluid passages and valves in a conventional way so as to permit hydraulic forces applied to the small cylinder to be transmitted the large cylinder for exerting hydraulic forces to lift the piston under mechanical advantage. Forces are applied to the small cylinder be means of a plunger 31 (FIG. 3) that exerts a load directly on the hydraulic contents of the small cylinder Mounted on top of the small cylinder 30 is a cylindrical collar 32. Two frame members 34 flank the collar and are connected to the base plate 28. A push rod 36 is provided for activating the plunger 31. The push rod 36 includes an elongate needle 38 having an axis, shaped to slide along the axis within the supporting collar 32 and to contact the plunger 31 for activating the same. Mounted symmetrically on top of the needle is a generally rectangular window 40 having a slot 42 extending perpendicular to the axis of the needle.

A camshaft 44 is provided for exerting a vertical reciprocating motion to the push rod 36. The camshaft includes two opposing discs 46 each having a center point. The camshaft is configured to rotate about an axis extending through the center points of the two discs. An elongate cylindrical rotor 48 spans between the two discs, offset from the center points of the discs. Each disc has a bush 50, configured to fit snugly in an opening 52 at an upward extremity of each frame 34. Optionally, the bushes and openings may be configured to include ball bearings 53 as desired.

When the jack system is assembled, as best seen in FIG. 1, the needle 38 of the push rod 36 slides within the collar 32, the needle being in contact with the plunger 31. The camshaft 44 rests on the frames 34 via the bearings 50, with the rotor 48 passing through the slot 42 in the window 40. A return spring 52, each terminal end flanked by a washer 54, surrounds the collar 32 and the needle 38 residing within the collar.

The axial extremities of the camshaft terminate in at least one, preferably two, nuts 56 which are preferably hexagonal head (hex head). These nuts 56 protrude from the camshaft to provide an unimpeded and convenient point of coupling for a mating hex head socket (not shown) attached to a driver which may be a pneumatic driver, a power cord driver, or a rechargeable battery powered driver, or the like.

Thus, in use, the operator of the jack system positions the jack under the object which he wishes to elevate, and takes care to expose the nuts 56 of the system (or one nut where it is not possible to expose two nuts) to a point that provides easy access for further operation by a powered driver. He then takes a powered driver such as described above having a socket shaped to mate with at least one of the nuts 56 and couples the socket to the nut. By activating the driver, he causes the camshaft 44 to rotate about its axis while mounted on the bushes 50. The rotation of the camshaft causes the rotor 48 to orbit around the axis of the camshaft, while the rotor is positioned within the slot 42 of the push rod 36. This action causes the needle 38 to reciprocate vertically in line with the plunger 31 while in contact with the plunger 31 of the small cylinder 30, thereby activating the hydraulics of the jack system to lift the ram piston 24, 26. The operator then removes the driver and stores it, leaving the low profile jack system 20 to hold the load in an elevated position. There is no handle that can be left protruding from the jack to cause a hazardous situation. There are no electric wires protruding from the jack system. There is no motor, or gear system, mounted with the jack to increase the profile of the jack system, as used in a garage or shop work space, and thereby enhance the hazard inherent in a jacking system.

Thus, an operator of the jack system of the present invention has the ability to rapidly deploy the jack system, rapidly elevate a load with a separable powered driver system, and then remove the driver system to leave the jack with a low profile to support the load.

Thus, it is seen that the jack system of the present invention provides novel and useful features for elevating loads within a crowded workshop environment, and overcoming shortcomings in the prior art. The present invention may, of course, be carried out in other specific ways than those herein set forth without departing from the essential characteristics of the invention. The present embodiments are, therefore, to be considered in all respects as illustrative and not restrictive, and all changes coming within the meaning and equivalency range of the appended claims are intended to be embraced therein.

We claim:

1. A hydraulic jack system of a kind having a large hydraulic cylinder for elevating a ram piston, a small hydraulic cylinder hydraulically interconnected with the large cylinder for applying an input load via a plunger, comprising:

a base plate upon which the large cylinder and the small cylinder are mounted;

a push rod for reciprocally moving the plunger on a first axis and, thereby, for causing the plunger to apply an input load through the small cylinder to the jack system so as to elevate the ram piston of the large cylinder;

a camshaft configured to rotate about a second axis and, thereby, to exert a reciprocating motion to the push rod and to the plunger, the camshaft having a first terminal end and a second terminal end, each terminal end lying on the second axis;

wherein, each of the first and second terminal ends of the camshaft is tipped only by a nut rotationally fixed to each terminal end; and each nut fixed to each terminal end is positioned in relation to the jack system to receive a socket that is mounted on a powered driver.

2. The hydraulic jack system of claim 1, wherein the camshaft has a rotor offset from the second axis, and wherein the push rod defines a linear slot extending perpendicular to the first axis, and the rotor is positioned to pass through the slot.

3. The hydraulic jack system of claim 1, wherein the camshaft is mounted to two frame members, each frame member being mounted on the base plate.

4. The hydraulic jack system of claim 1, wherein the jack system further comprises a return spring surrounding a portion of the push rod.

5. The hydraulic jack system of claim 1, wherein a collar is mounted on the small hydraulic cylinder, and a portion of the push rod is configured to slide within the collar.

6. The hydraulic jack system of claim 1, wherein support for the camshaft is provided at two positions along the camshaft.

7. The hydraulic jack system of claim 6, wherein the support for the camshaft at the two positions along the camshaft include ball bearings.

8. The hydraulic jack system of claim 6, wherein the support for the camshaft at the two positions along the camshaft includes two frame elements mounted to the base plate.

* * * * *